March 3, 1953  R. H. SMITH  2,630,463
ELECTRIC MOTOR ARMATURE

Filed Dec. 9, 1950  2 SHEETS—SHEET 1

INVENTOR.
*Richard H. Smith*
BY
*Harry S. Ducasse*
ATTORNEY.

Patented Mar. 3, 1953

2,630,463

UNITED STATES PATENT OFFICE 2,630,463

ELECTRIC MOTOR ARMATURE

Richard H. Smith, Canton, Ohio, assignor to The Hoover Company, North Canton, Ohio, a corporation of Ohio Application December 9, 1950, Serial No. 199,984

2 Claims. (Cl. 171—252)

My invention relates to dynamo electric machines and in particular to a novel construction for wound rotor type armature.

The particular object of my invention is to provide an armature construction characterized by the provision of winding slots having substantially straight sides and wide mouths to facilitate laying the windings therein and enclosed in a shell designed to retain the windings in the slots and to withstand high centrifugal forces without adversely affecting the magnetic properties of the machine.

It is a further object of my invention to provide an enclosing structure for an armature, capable of withstanding high centrifugal forces in operation and of retaining the windings within the armature winding slots, consisting of a plurality of axially spaced sleeves of magnetic material which may be fabricated into a one-piece structure by providing small section, circumferentially spaced, axially staggered webs connecting adjacent sleeves to produce a one-piece structure having high eddy current resistance and structural strength.

Other objects and advantages of the invention will become apparent as the description proceeds when taken in connection with accompanying drawings, in which.

Figure 1:
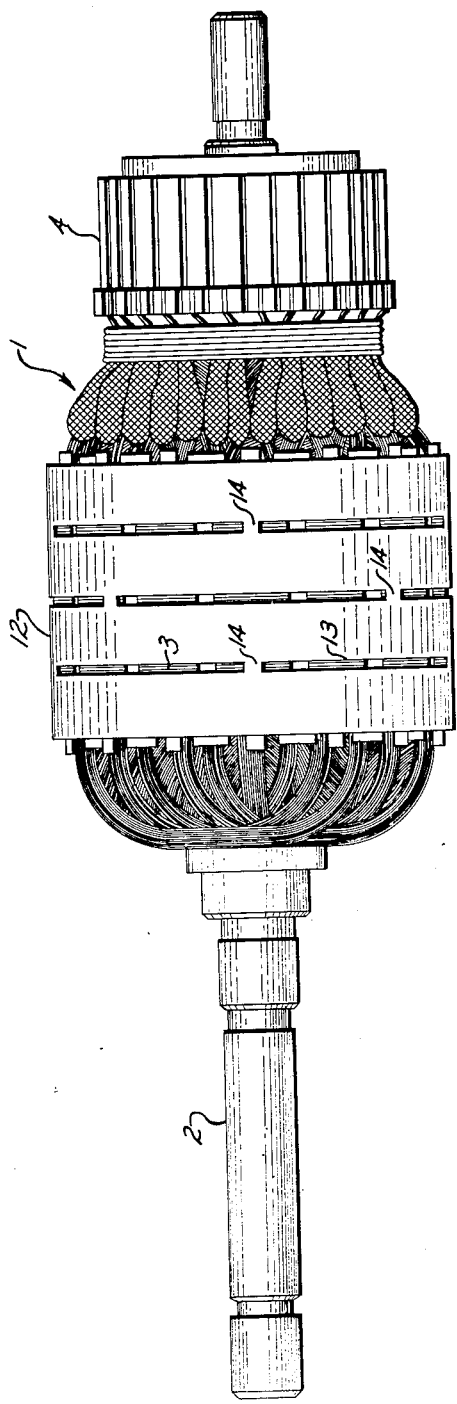
Figure 1 illustrates the armature of a commutated motor embodying my invention.
Figure 2:
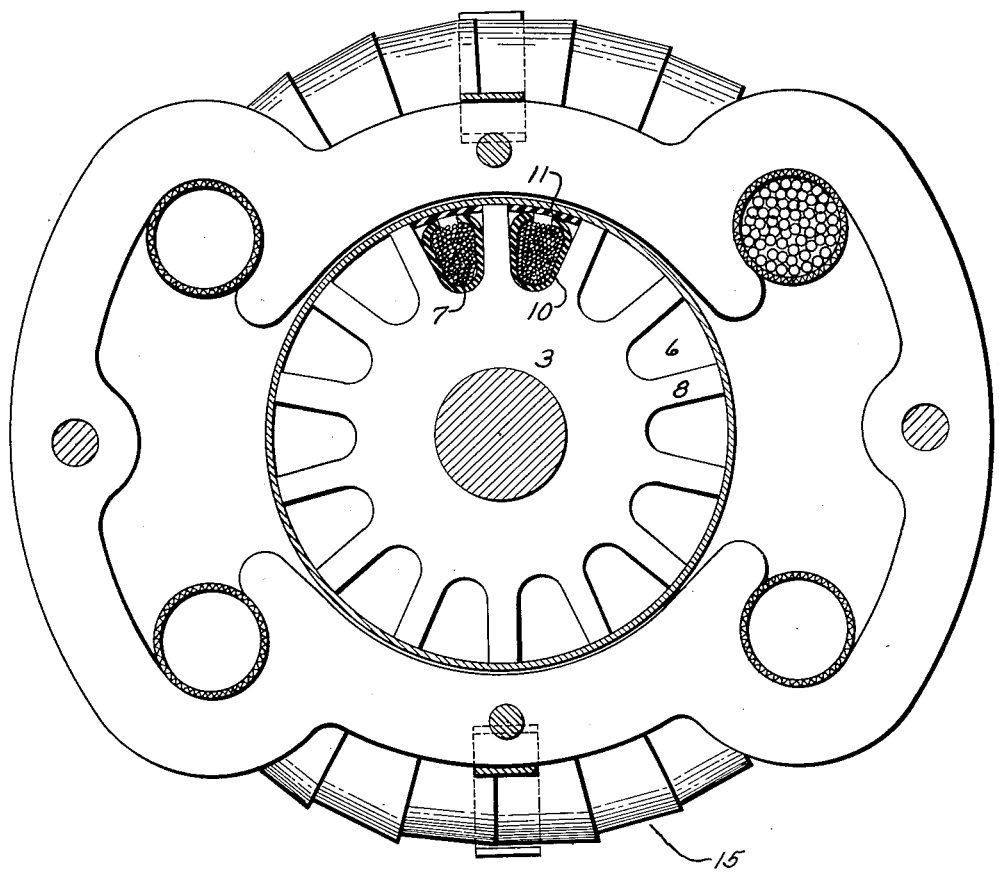
Figure 2 is a cross-sectional view of one type of electric motor embodying an armature such as that illustrated in Figure 1.

Referring now to the drawings in detail and first to Figures 1 and 2 thereof, there is illustrated a motor armature indicated generally by the reference character 1 comprising a shaft 2 upon which a plurality of magnetic material laminations 3 are pressed or otherwise secured. The armature also includes a commutator 4 of any preferred type. The laminations 3 are provided with a plurality of peripheral slots 6 to receive the armature winding wires 7. The sides of the slots 6 are straight and are approximately radial with respect to the axis of rotation of the shaft 2. The sides of the slots depart from a true geometric radial condition in order to form the teeth 8 separating adjacent slots, of uniform width from the base of the slots to the outer periphery of the lamination. The lines forming the adjacent sides of each tooth 8 pass on opposite sides of the center of the lamination by an amount equal to approximately one-half the thickness of the tooth. Other tooth and slot configurations having wide mouth slot entrances may be used if desired. The foregoing construction provides winding slots 6 having rounded bases and divergent sides terminating in mouth portions forming the widest sections of the slots. As a result of this construction, it is very easy to lay the windings in the slots, either by hand or by machine.

In Figure 2, one of winding receiving slots is shown in its completed condition in which the windings 7 are surrounded by a slot liner 10 of insulating material, such as plastic impregnated paper, for example. The slot liners 10 are overlaid by slot mouth closure members 11 of material similar to that from which the members 10 are made. The open mouth slot construction permits the slot liners 10 and slot cover closures 11 to be emplaced with maximum facility. The armature is shown in Figure 2 in operative relation to a two pole field structure 15 of a high speed universal motor.

After the winding slot liners and slot closures have been properly assembled with the laminations 3, a plurality of cylindrical sleeves 12 constructed of thin section high strength magnetic steel are pressed over the laminations 3 having gaps 13 of the order of one-thirty-second of an inch between adjacent sleeves. The sleeves may, for example, have a thickness of the order of forty-thousandths of an inch. References in the specification and claims hereof to thin section sleeves refer to dimensions of the above specified order. As illustrated in Figure 1, the sleeves 12 are connected by narrow webs 14 interrupting the spaces 13. Thus each space 13 is in the form of a plurality, four as shown, of circumferential slots spaced by webs 14. The webs 14, connected to opposite sides of each sleeve 12, are circumferentially staggered. It has been found that eddy currents generated in the sleeves 12 tend to flow axially of the armature structure, and the provision of a plurality of spaced sleeves restrains these currents to small proportions and the resulting losses are within acceptable limits. It is expensive and cumbersome to assemble the sleeves 12 on the armature individually in proper spaced relation, hence the sleeves 12 and webs 14 constitute a single cylindrical member having a plurality of sets of circumferentially spaced slots at 13. The foregoing single assembly is readily fabricated from a single piece of metal and may be emplaced on the armature by a pressing or shrinking operation. Due to the small section and staggered arrangement of the webs 14, the eddy current flow path through all the sleeves 12 axially of the armature has a high resistance which restricts this loss to a small figure.

In assembling the apparatus, the armature is wound and the slot closures are inserted after which the sleeve structure 12 is placed upon the armature structure by shrinking or pressing. This insures a tight fit between the sleeve and armature laminations which will prevent magnetic losses due to the existence of any air gap between the parts.

Figure 3:
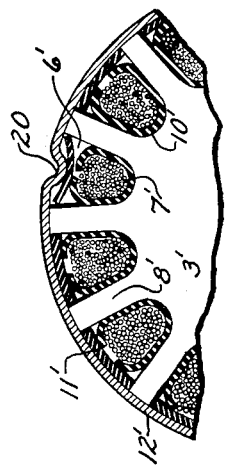
Figure 3 is a fragmentary sectional view illustrating a modified form of the invention.

In the form of the invention illustrated in Figure 3, most parts of the apparatus are identical with portions of the apparatus illustrated in Figure 2 and identical parts are given the same reference characters distinguished by the addition of a prime. This form of the invention differs from that previously described solely in the method of securing the sleeves 12' to the armature laminations 3'. The sleeves 12' are made slightly larger than the outside diameter of the laminations 3' to allow the same to slide onto the lamination structure after the winding slot closures have been applied. The sleeves 12' are then drawn down tightly upon the laminations 3' by rolling a small bead 20 therein in the manner illustrated in Figure 3. The extent of this bead is somewhat exaggerated in Figure 3 in order to illustrate the construction. The windings are loose enough in the slots 6' to allow slight additional crowding of the wires to accommodate the clamping bead.

The present invention provides a construction permitting very wide mouth armature slots allowing maximum facility in assembling slot liners, windings and slot closure strips therein. The very thin high strength steel sleeve assures firm anchorage of all elements contained in the slots even under the stress of extremely high centrifugal forces. The slotted structure formed by joining the sleeves to make a one-piece structure has been found to restrict eddy currents to a value which does not increase the losses to a large extent. The magnetic effect of the thin steel sleeve structure around the armature has been found to be comparatively small due to the fact that the same saturates very quickly and does not thereafter exert an appreciable distorting or short-circuiting effect upon the flux linking the field and armature structures.

Another important feature of the present invention results from the fact that the insulating slot closure members 11 are not called upon to withstand centrifugal stresses; consequently these members need only be heavy enough to withstand the electrical stresses to which they are subjected and may therefore be appreciably lighter and less expensive than the slot closures conventionally utilized.

In assembling the apparatus, the slot liners 10 and the windings 7 may be applied to the core structure which is then placed in an assembly jig constructed to allow the slot closures 11 to be inserted and to hold such closures temporarily while the sleeve 12 is pressed on the armature assembly.

The present invention simplifies the structure of the dies used to punch out the armature laminations, reduces the expense and difficulty of applying the slot liners, windings and slot closures to the armature, and positively anchors the windings in the slots by a simple, economical, one-piece structure capable of withstanding large centrifugal forces on the windings generated by very high-speed operation of the armature.

I claim:

1. In an electric motor, a rotary armature comprising, a shaft, a laminated armature core of magnetic material mounted on said shaft and formed with a plurality of wide mouth peripheral slots extending from end to end through said laminated core and opening radially outwardly thereof, armature windings having portions thereof laid in said slots, a plurality of cylindrical sleeves of magnetic material tightly embracing said core circumferentially, said sleeves being constructed of thin section high strength magnetic material whereby said sleeves will be magnetically saturated without large distortion and short circuiting of the motor field and will withstand centrifugal forces tending to displace said windings from said slots, and said sleeves being spaced from each other axially of said core to provide narrow axial gaps therebetween of lesser axial length than the axial length of said sleeves to interrupt eddy current flow in said sleeves while providing circumferential support for said windings distributed over the major portion of the axial length thereof.

2. Apparatus according to claim 1 in which said sleeves are spaced from each other by small circumferential webs of the same material bridging said gaps in circumferentially spaced relation to each other and with the webs bridging the gaps bounding opposite sides of each of said sleeves staggered circumferentially of said core to prevent the formation of an eddy current path parallel to the axis of said shaft.

RICHARD H. SMITH.

REFERENCES CITED

The following references are of record in the file of this patent:

UNITED STATES PATENTS

| Number | Name | Date |
| --- | --- | --- |
| 401,362 | Billberg | Apr. 16, 1889 |
| 541,380 | McLaughlin | June 18, 1895 |
| 876,930 | Bergman | Jan. 21, 1908 |
| 1,839,299 | Cornu | Jan. 5, 1932 |
| 1,978,100 | Buerke | Oct. 23, 1934 |
| 2,279,014 | Sawyer | Apr. 7, 1942 |